Nov. 26, 1946.  J. W. FAY ET AL  2,411,717
EDUCATIONAL DEVICE
Filed Nov. 12, 1943
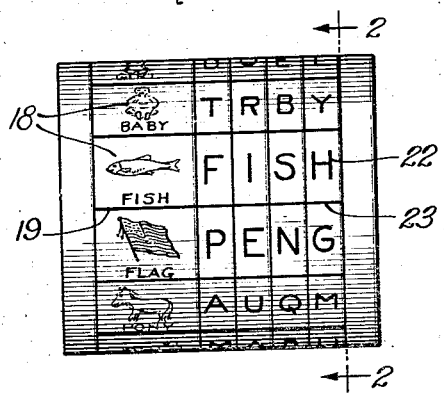
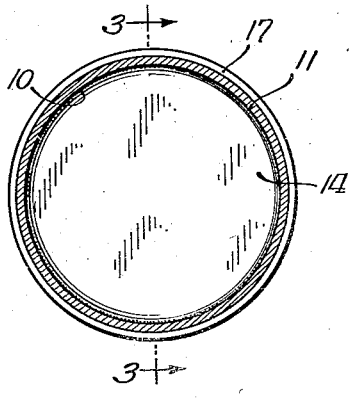
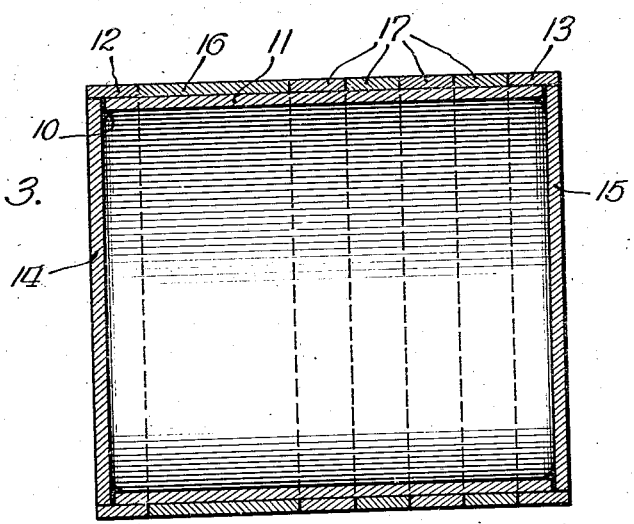
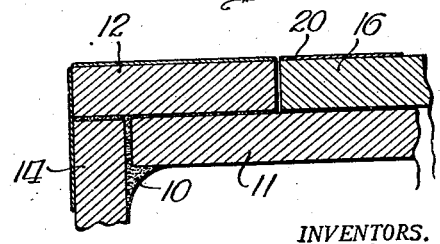
INVENTORS.
Joseph W. Fay
and Rudolph Fay
BY
Attys.

Patented Nov. 26, 1946

2,411,717

UNITED STATES PATENT OFFICE 2,411,717

EDUCATIONAL DEVICE

Joseph W. Fay and Rudolph Fay, Villa Park, Ill.;
said Rudolph Fay assignor to Joseph W. Fay Application November 12, 1943, Serial No. 509,986

4 Claims. (Cl. 35—77)

This invention relates to an educational device.

Primarily, the invention contemplates the provision of an educational device of a character that will not only serve to arouse the interest of small children, but will also serve to familiarize such children with the names of various animate and inanimate objects, as well as to afford elementary instructions in the spelling of the names of such objects.

Briefly, the invention comprises a cylinder or drum upon which is mounted a plurality of circumferentially rotatable rings disposed in side by side relationship. In the simplest form of the device there are four of such rings. A plurality of pictorial representations of various animate and inanimate objects, with the name of the object printed adjacent thereto, is suitably disposed around the circumference of one of the rings, while each of the other three rings has various letters of the alphabet spaced about its circumference. The names of the objects selected for this form of the device comprises four letter words, and the letters of the alphabet selected for the alphabet rings is such that the names of all the objects on the object ring may selectively be spelled by bringing the proper letters into register through rotation of the alphabet rings. The child can, therefore, select an object and by rotation of the alphabet rings bring the proper letters into register with the object to spell the name thereof. In learning to spell, the child may do this by following the letters comprising the name of the object which is printed adjacent thereto. That is, the child may select an object, note the first letter of the name printed by the object, find the corresponding letter on the alphabet ring adjacent the object ring, after which such letter is brought into register with the object by rotation of the alphabet ring. This same procedure is followed with the other two alphabet rings to spell out the name of the object. Conversely, after the child has learned to spell the names of various objects, he or she can bring the proper letters into register to spell out the name of a certain object, after which the object bearing such name may be found on the object ring and rotated to register therewith. In either case, it will be apparent that the child in playing with the device will unconsciously and without effort become familiar with various objects, with the names thereof, and the spelling of such names, and all without the drudgery which usually accompanies the acquirement of such knowledge.

It will be obvious from the above that the number of rings may be increased to spell out four, five and six letter words, etc.

Other features and advantages of the invention will in part be obvious and in part hereinafter pointed out, and they consist generally in the feature of construction, combination of elements and arrangements of parts which will be exemplified in the construction to be described, and of which the scope of application will be indicated in the appended claims.

In the drawing, in which is shown the preferred illustrative embodiment of the invention:

Figure 1 is an elevational view of a device embodying the principles of the present invention;

Figure 2 is a vertical sectional view of the device of Figure 1, taken, substantially, along the plane of the line 2—2 thereof;

Figure 3 is a vertical sectional view taken substantially along the plane of the line 3—3 of Figure 2;

Figure 4 is a fragmentary sectional view of a detail of the device of Figure 1.

Referring now in detail to the drawing, the preferred form of the present invention comprises a cylinder 11 of suitable length and diameter for the purpose hereinafter described, and which may conveniently be cut from tubular paper stock, or other suitable or preferred material, to the required dimensions. At its opposite ends, cylinder 11 is embraced by the closely fitting relatively narrow bands 12, 13, which bands project beyond the ends of the cylinder for a distance substantially equivalent to the thickness of discs 14, 15, which discs form closure members for the opposite ends of the cylinder. The discs and bands are also preferably formed from suitable paper stock and, together with the cylinder, are firmly united as by means of a suitable adhesive 10. It will be apparent that the discs 14, 15 and bands 12, 13 may be made integral to form a cap closure for the ends of the cylinder.

Bands 12, 13, in addition to aiding in securing discs 14, 15 to the cylinder, serve as retaining members for an object band 16 and a plurality of alphabet bands 17. In the form of device selected for illustration there are four alphabet bands. They are disposed circumferentially of the cylinder 11 in side by side abutting relationship and have a snug but not tight fit with the cylinder so that they may be rotated thereabout. Preferably, the bands 16, 17 are also cut from tubular paper stock, and in the assembly of the device are put in place on the cylinder before securing the final retaining band 12 or 13 thereto. The thickness of each band on the cylinder is substantially equal so that the outer surfaces thereof will be flush with each other. In width, bands 17 are substantially equal to bands 12, 13, but band 16 has a width preferably three times that of the bands 17.

A strip of paper or other suitable material 20, having a plurality of pictorial representations of dissimilar objects 18 imprinted thereon is secured circumferentially to band 16. These objects are separated by the division lines 19 and have their name printed immediately below the object. The objects may be animate ones, such as a fish, pony, baby, etc., inanimate ones such as a flag, boat, tree, etc., or a combination of both, or other signs or symbols. The bands 17 likewise each have a strip of paper secured therearound, and upon which are imprinted various letters 22 of the alphabet separated by the division lines 23. The letters of the alphabet selected will, of course, be those that will permit spelling of the names of each of the objects on band 16. In this connection, it will be noted that the letters of the alphabet are so distributed on the bands that only a single word may be spelled thereby at one time, thus to require rotation of the bands and the proper selection of the letters of a word to be spelled.

It will be apparent from the foregoing, that in use of each of the devices, an object, the name of which is to be spelled, may be selected on the object band or disc. Next, the first alphabet band adjacent the object band can be rotated until division lines 23 above and below the first letter in the name of the object are brought into register with the division lines above and below the object on the object band. Like procedure with the other three bands will result in an object and its name extending longitudinally across the surface of the band or cylinder. Conversely, after a child has learned to spell certain words, the alphabet bands may be rotated to register the letters of a selected name of an object, after which the object may be found by rotating the object band and registering the division lines above and below such object with the division lines above and below the letters comprising the name thereof.

While the illustrated device is shown as employing four alphabet bands, it will readily be apparent that the number of bands may be varied, the only requirement being that there be a sufficient number of bands to spell out the names of the objects shown on the object band, whether such objects have names comprising three, four or five letters, or more. Indeed, as a logical development of the present invention, entire words could be substituted for the letters on the alphabet bands and, by rotation of the bands, proper words could be brought into register to form sentences. Such words and sentences could be employed alone, or in conjunction with the object band.

While a preferred embodiment of the invention has been illustrated and described, by way of example, it will be obvious that changes may be made therein within the spirit and scope of the invention and, therefore, the invention is not to be limited to the precise form herein described, except in so far as it may be limited by the appended claims.

We claim:

1. A device of the class described formed from two members of tubular cardboard stock comprising a first member providing a tubular support, a second member having an internal diameter substantially equal to the external diameter of the first member and adapted to be received by said first member with a frictional fit, said second member being divided into a plurality of bands, discs closing the open ends of said first member, and abutting and secured to the two end bands thereon, said bands intermediate the two end bands being rotatable about the first member, one of said intermediate bands carrying a plurality of pictorial representations of dissimilar objects, and the others of said intermediate bands carrying selected letters of the alphabet.

2. A device of the class described formed from two tubular members comprising a first member providing a tubular support, a second member having an internal diameter substantially equal to the external diameter of the first member and adapted to be received by the first member with a frictional fit, said second member being divided into a plurality of bands disposed in side-by-side relationship on said first member, the two end bands being secured to said first member and confining the intermediate bands therebetween, said intermediate bands carrying pictorial representations and letters on their peripheries and being rotatable about said first member.

3. A device of the class described formed from a pair of tubular members each having a wall thickness that is of less radial extent than the internal radius of said members, comprising a first member providing a support, a second member having a sufficiently large internal diameter to receive said first member and divided into a plurality of bands disposed in side by side relationship on said first member, and means secured to said first member and confining said bands therebetween for individual rotation about said first member.

4. An educational device formed from a pair of tubular members each having a wall thickness that is of less radial extent than the internal radius of said members, comprising a first member providing a support, a second member having a sufficiently large internal diameter to receive said first member and divided into a plurality of bands disposed in side by side relationship on said first member, and means secured to said first member and confining said bands therebetween for individual rotation about said first member, the bands constituting said second member having indicia adapted to be moved into and out of correlation by relative rotation of said bands on the periphery of said first tubular member.

JOSEPH W. FAY.
RUDOLPH FAY.